Aug. 21, 1928.

D. T. MAY ET AL 1,681,245

CABLE SPLICING MACHINE

Filed May 6, 1925   2 Sheets—Sheet 1

Inventors:
David T. May
Charles G. McCormick
by E. W. Adams Atty.

Aug. 21, 1928.  1,681,245
D. T. MAY ET AL
CABLE SPLICING MACHINE
Filed May 6, 1925   2 Sheets-Sheet 2
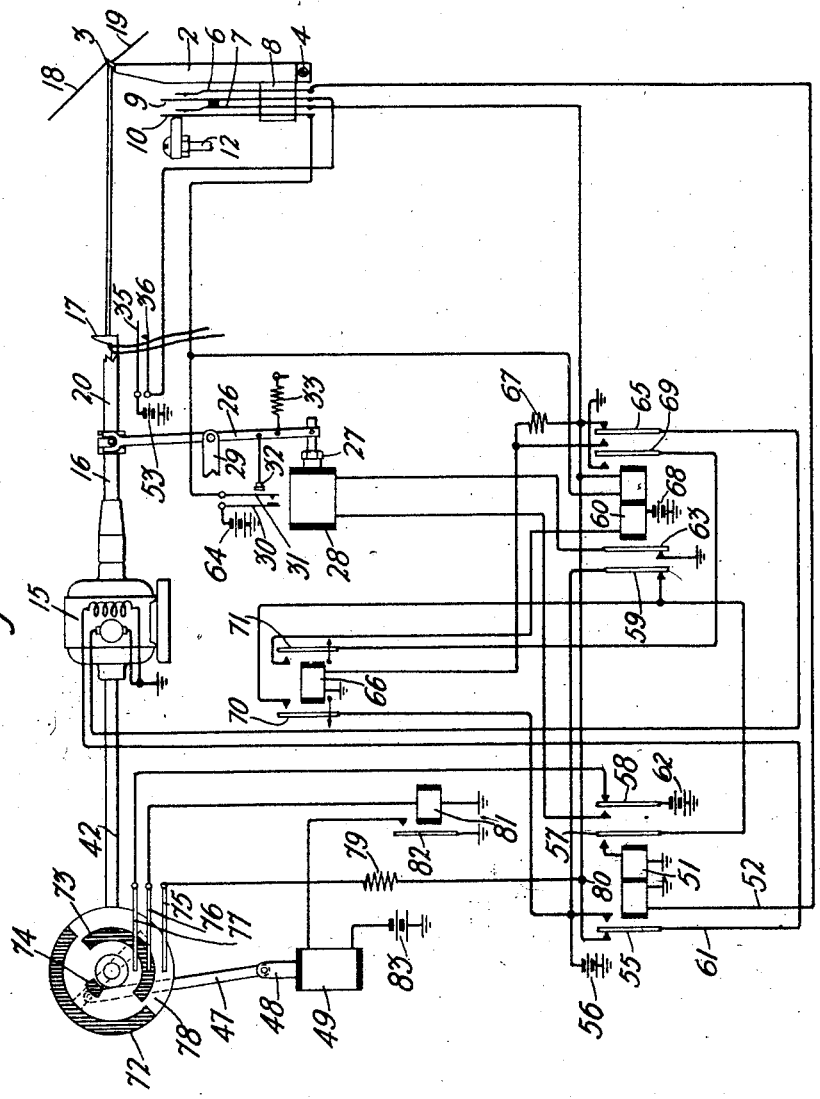
Inventors:
David T. May
Charles G. McCormick
by E.W. Adams Atty.

Patented Aug. 21, 1928.

1,681,245

UNITED STATES PATENT OFFICE.

DAVID T. MAY, OF PORT WASHINGTON, AND CHARLES G. McCORMICK, OF NEW YORK, N. Y., ASSIGNORS, BY MESNE ASSIGNMENTS, TO WESTERN ELECTRIC COMPANY, INCORPORATED, A CORPORATION OF NEW YORK.

CABLE-SPLICING MACHINE.

Application filed May 6, 1925. Serial No. 28,320.

This invention relates to a machine for splicing cable and particularly to the splicing of telephone and telegraph cables.

The principal object of this invention is to provide a compact, rapid and efficient machine for splicing the wires of a cable so as to make a uniform solderless splice in a short time without the necessity of employing the art of a skilled manual cable splicer.

Heretofore, the two ends of the cables to be connected were brought together, the paper covering of the respective individual wires stripped by hand and the wires twisted together, which often resulted in a splice of uneven wire lengths as well as being a difficult and tedious operation. By this invention, a splicing machine is provided which makes a tight and uniform splice in paper insulated cable wire, thereby obviating the necessity of soldering in most cases as well as the necessity of employing the services of a highly skilled cable splicer. More specifically, this invention consists of a supporting member for holding two or more wires at the base of the intended splice, an electromagnetically operated wire cutter and grip for holding wire ends on the motor driven twisting shaft, automatic means for stopping the twisting operation when the splice is completed, and electromagnetic means for restoring the machine to the initial starting position.

Figure 1:
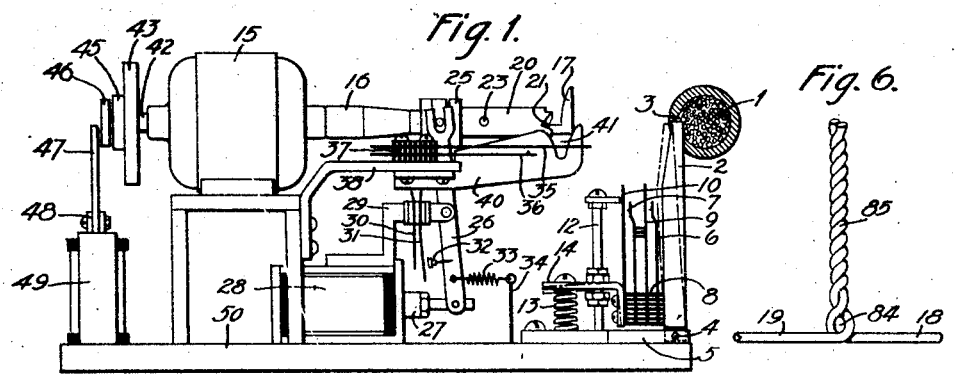
Figure 6:
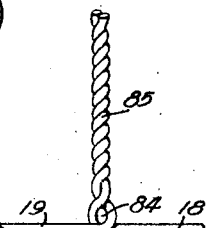
Figure 2:
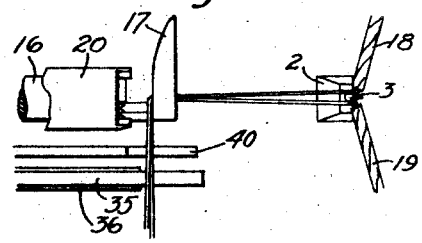
Figure 3:
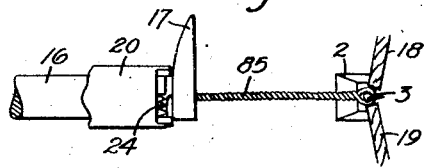
Figure 7:
Figure 4:
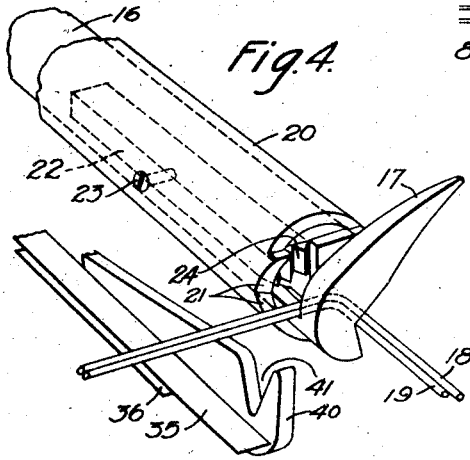
Figure 5:
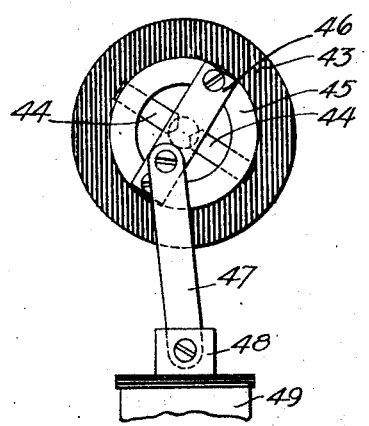

Referring to the preferred embodiment of this invention set forth in the drawings in which like reference characters designate like parts in the several views, Fig. 1 is a front elevation of the machine of this invention, Fig. 2 is a plan view of two wires at the beginning of the twisting operation, Fig. 3 shows a completed twisted splice at the end of the twisting operation, Fig. 4 is a perspective view of the rotatable electromagnetic wire gripping head before closure, showing the starting switch springs, Fig. 5 is a face view of the electromagnetic restoring means for returning the machine to its initial operative position, Fig. 6 shows a completed splice, Fig. 7 shows the arrangement of wires for a butt splice, and Fig. 8 is an operative plan of the electrical scheme of the machine.

Referring particularly to Fig. 1, numeral 1 designates one of the two cable ends as they project end to end in position for splicing. The wire holding member consists of a vertical bar 2, having a hook-shaped knife blade 3 at its upper end, and longitudinally pivotal on the pin 4 mounted in the base 5. Contact springs 6, 7, 9 and 10 are mounted in insulator block 8 which is rigidly attached to the pivotal bar 2 the spring arrangement being such that when the bar is moved forward, stud 12 causes spring 10 to make contact with spring 7 which in turn operates spring 9 to make contact with spring 6. The coil spring 13 acting through lever 14 attached to insulator block 8 resists the closure of contact springs 6—7 and 9—10 to keep member 2 in its forward and inoperative position as shown.

The twisting mechanism consists of an electric motor 15, or other rotary machine or mechanism, directly or through a flexible shaft attached to the armature of which is the twisting shaft 16, reduced in section near its outer end and which is shaped with a horn 17, around which the wires 18 and 19 which are to be spliced are bent as shown in Figs. 2, 3 and 4. Horn 17 is especially designed to offer minimum frictional resistance to the insertion of the wires, which may be rapidly bent around it at any point on its inner surface and will always slip down so as to lodge in the proper position on the reduced section at the base of the horn as the wires are drawn taut. A cylindrical sleeve 20 is axially slidable on the shaft 16 so as to grip the ends of wires 18 and 19 securely to the shaft and cut off their free ends by means of the knife edge 21 registering with the curved rear edge of horn 17. Sleeve 20 is keyed to shaft 16 by means of key 22 fastened by screw 23 to the sleeve and provided at its outer end with a number of sharp serrations 24 which grip the wire ends securely against the rear face of horn 17, after the free ends have been cut off by knife edge 21. A collar 25 at the rear end of sleeve 20 cooperates with a forked simple lever 26, actuated by solenoid 28 through its armature 27 attached to its lower end. The fulcrum of lever 26 consists of a bracket 29 mounted on the top of solenoid 28, and carries two contact springs 30 and 31 insulated from each other and from bracket 29. As solenoid 28 attracts its armature 27 to advance sleeve 20, a button 32 attached to lever 26 engages and closes contact springs 30 and 31. A coil spring 33, one end of which is rigidly attached to a stationary pin 34, retracts the lever 26 and sleeve 20 to open contacts 30 and 31 as solenoid 28 releases its armature 27.

The machine starting switch consists of contact springs 35 and 36 mounted in an insulating block 37 fastened to the upper surface of a bracket 38 which is rigidly attached to the machine frame. A guard 40 fixed to bracket 38 is provided with a V-shaped notch 41 extending below the normal position of contact spring 35, so that when wires 18 and 19 are brought around horn 17 and into slot 41, they engage spring 35 so that it contacts with spring 36 to close the operating circuit. The guard is also designed so as to protect the contact springs against premature operation and injury.

The mechanism for restoring the machine to the initial position in readiness for the next splice, i. e. in the position of Fig. 4, is shown in Fig. 5 in face view and consists of the disc 43 fixed to the ring 45 which ring is fastened to shaft 42 of motor 15 by means of two members 44. Ring 45 carries crank 46 and connecting link 47 connected to the armature 48 of solenoid 49.

The various elements of the complete machine are mounted on the base 50, which may be supported on the floor or the wall of a man-hole or suspended from the cable ends, in any suitable manner as desired.

Referring now particularly to the schematic drawing of Fig. 8, for the purpose of describing the operation of the machine of this invention, two corresponding wires 18 and 19 are selected from the two cable ends and drawn tightly around the hook-shaped knife blade 3 as shown in Fig. 2. The knife blade is just sharp enough to partly cut through the paper insulation of the wires so that it may be drawn off of the wires by the operator as they are drawn taut. Bar 2, being pivoted at 4 so as to move to the left as the wires are drawn over hook 3, causes contact springs 6 and 7, which are mounted on bar 2 to engage contact springs 9 and 10 when spring 10 strikes stud 12 which is rigidly mounted on base 5. The closure of these contacts places the machine in operable condition. The wires are then drawn by the operator around the horn 17 of the twisting shaft 16 and into the V-shaped notch 41 of guard 40 to close contact springs 35 and 36, in the manner shown in Fig. 4. The closure of contacts 35 and 36 operates relay 51 from battery 53 through contacts 6 and 9. Relay 51 at its contact 57 locks up through its second winding by way of armature 59 of relay 60. The operation of relay 51 cuts off the restoring circuit at contact 58, connects the field of motor 15 directly to battery 56 through contact 55 and lead 61 and operates the sleeve actuating solenoid 28 by means of battery 62 through contact 58 and normally closed contact 63 of relay 60.

Solenoid 28 attracts its armature 27 and consequently moves lever 26, pivoted at 29, against the tension of spring 33, thereby advancing sleeve 20 to cut off the tips of wires 18 and 19 and grip them securely against the base of horn 17. The motion of lever 26, by means of button 32, closes contacts 30—31 which through battery 64, contacts 7 and 10 and normally closed contact 65 to the armature of the motor causes the twisting shaft to revolve, battery 56 being fed to the field of the motor through lead 61 and armature 55 of relay 51. At the same time relay 66 is operated by battery 64 through contacts 30—31, 7—10, and resistance 67, which is in series with the relay winding to prevent the drawing of heavy current through the winding.

The motor revolves the twisting shaft to twist the wires as shown in Fig. 3 until they are completely twisted together, whereupon the stresses set up in the twisted wires finally cause them to twist off at the outer edge of horn 17. The breaking of the wires allows the supporting head bar 2 to return to its normal forward position under the stress of spring 13, thereby opening contacts 6—9 and 7—10. The opening of contacts 7—10 opens the battery supply of the motor armature and removes the short circuit around the winding of relay 60, and this relay operates by battery 64 through contacts 30—31, resistance 67, and the winding of relay 66. Relay 60 locks up by battery 68 through contact 69 and contact 71 of relay 66. The operation of relay 60 performs the following functions:

(a) Releases the sleeve solenoid 28 due to the opening of its circuit at contact 63, which permits sleeve 20 to retract under stress of spring 33 to release the ends of the wire remaining clamped between sleeve 20 and horn 17, and to open contacts 30—31;

(b) Opens contact 59 in the locking circuit of relay 51 but does not release it, since contact 59 is bridged by contact 70 of relay 66 which remains operated until the motor stops;

(c) Closes contact 65 of relay 60 which short-circuits the motor armature through the low resistance slow release relay 66 and stops the motor, relay 66 remaining operated on the diminishing armature current and momentarily thereafter, due to its slow release characteristic, thus assuring a definite stoppage of the motor before the next circuit operation occurs. Upon release of relay 66, relays 51 and 60 release, due to the opening of contacts 70 and 71 respectively, relay 51 being designed to release before relay 60.

The release of relay 51 brings into operation, the means for restoring the twisting head to its correct angular position in readiness for splicing other wires i. e. in the manner shown in Fig. 4 in which the horn 17 projects upwardly.

The operation of the restoring means is dependent upon the angular position in which the motor armature stops, which determines the position of the insulating arcs 72, 73 and 74 relative to the brushes 75, 76 and 77 and the conducting contact surface 78 of the contact disc 43 attached to the motor shaft 42. When the disc is in the position shown in Fig. 8, the release of relay 51, closing contact 58, allows current to flow from battery 62, through contact 58, brush 77, contact surface 78, brush 75, and resistance 79 to point 80 at which the current divides, a part flowing through contact 65 to the armature of motor 15, and part by way of contact 55 to the field of motor 15. This causes the motor to revolve slowly at a speed depending upon the value of resistance 79, until the circuit is broken through the windings due to the engagement of brush 75 with the insulating arc 72, while brush 76 simultaneously leaves the insulating arc 73 and engages a conducting surface 78. The current then flows from battery 62 by way of contact 58, brush 77, contacting surface 78, brush 76, and relay 81, back to ground, thereupon operating relay 81 to close contact 82, which allows current from battery 83 to flow through solenoid 49. The operation of solenoid 49, through its armature 48, link 47, and crank 46, pulls shaft 42 of motor 15 around to its normal operative position, i. e., with horn 17 projecting upwardly as shown in Figs. 1, 2, 3, 4 and 7. In this position, the circuit through solenoid 49 is broken by the engagement of brush 76 with an insulating arc 74, which releases relay 81 and opens contact 82.

It is evident that in case the armature of motor 15 stops in such an angular position that the crank 46 of the restoring mechanism is below the horizontal center line of the shaft 42, complete restoration is accomplished solely by solenoid 49. In case the motor stops with crank 46 above the horizontal center line, restoration occurs in two steps, firstly, by current through the motor windings as hereinbefore described, and, secondly by the operation of solenoid 49. This is necessary in order to provide for any stoppage at or near the top dead center of crank 46, in which case the solenoid would be ineffective and inoperative. It will be understood that the various batteries shown in the drawings may be replaced by a common battery or current supply with the positive pole grounded.

In addition to the operating efficiency and rapidity of the machine of this invention, by which the uniform solderless splice can be made in less than that time required by a highly skilled manual splicer, attention is particularly directed to the type of splice so made. Fig. 6 shows such a splice as completed by the machine just after the condition shown by Fig. 3, in which the wire is about to be twisted off at the edge of horn 17. After the wire is removed from the machine, it will be seen that hook 3 around which the wires are first bent, leaves a loop or opening 84 between the wires in the form of a relatively loose twist as compared to the body 85 of the splice. This is particularly advantageous as it prevents excessive working of the wire metal at a point where strength is particularly desired. Furthermore, loop 84 gives sufficient play and flexibility to the splice that it may be freely handled subsequently without danger of breakage, and also the unavoidable slight difference in the lengths of the wires of the completed splices will be taken up by this extra loop and thus the otherwise additional strain on the shorter wire is avoided. The greater flexibility afforded by this additional loop allows the body 85 of the splice to be bent over more readily into its final position parallelly adjacent to one of the wires 18 or 19 before the insulating tube not shown is slipped over to complete the splice. The size of the loop 84 may be obviously made to suit various conditions by changing the size and shape of the hook shaped knife blade 3.

The machine of this invention may be adapted to make several different kinds of splices as for instance, a butt splice as shown in Fig. 7 where the wires come from the same direction. In such a case, an additional knife blade 84 is arranged parallel to knife blade 3 on bar 2 with a space between them sufficiently large to admit a single wire, as shown. The wires are brought around the knife blades so that one of them is passed between the knife blades and the paper insulation stripped off by the operator.

It has been found that by shifting bar 2 to the right of the center line of the machine, the pitch of the twist may be varied according to the distance of bar 2 from the center line, for instance, as the distance of bar 2 from the center line is increased, the pitch of the twist is increased so that twists of different pitch may be obtained as desired.

It is obvious that the machine of this invention may be applied to various purposes for the twisting and splicing of wires of large or small gauge and it is therefore to be understood that this invention is not confined to the details shown in the drawings and set forth in the specifications, nor is it the intention to limit the claims upon this invention to the construction of the individual elements disclosed, but that this construction will admit of extensive variations without departing from the spirit of the invention within the scope of the appended claims.

What is claimed is:

1. In a wire splicing machine, a wire support, a motor, a guide on the motor shaft adapted to receive the wires from the support, a switch operated by the placing of the wires on the guide, a circuit including a magnet closed thereby, a sleeve on the motor shaft operated by said magnet to clamp the wires between the sleeve and guide and sever the excess wire, a circuit including the motor closed by the operation of said magnet to cause said motor shaft to twist said wires, and a switch actuated by the breaking of the wire to open the motor circuit.

2. In a wire splicing machine, a knife mechanism over which the wire is placed and which partly assists in the stripping of the paper off of the ends of the wires to be twisted, a motor shaft carrying a lug around which the wires to be twisted are bent, a magnetically operated sleeve which cuts off and holds the wires ready for the twisting operation, a motor circuit closed upon the completion of the operation of said sleeve whereupon said shaft twists the wires, and a positioning magnetic device which restores the shaft to normal position after the finishing of a splice so that it will be ready for the next splice.

3. A wire splicing machine comprising wire gripping means, mechanical wire twisting means, electrical starting means, magnetic stopping means operated by the breaking of said wires at the completion of the splice, and magnetic means for restoring said machine in readiness for the succeeding splice.

4. A machine for splicing wire consisting of a wire guide, a rotatable wire clamp, means for rotating said clamp, means operated by the breaking of the wires for stopping said rotating clamp, and automatic means for restoring said machine to its initially operative position.

5. A machine for splicing wire consisting of a wire gripping head, a rotatable wire twisting head, magnetically operated means for cutting off and gripping the wire to said twisting head, means for rotating said twisting head, and automatic means for stopping said head upon the completion of the splice.

6. A wire splicing machine comprising a revolvable shaft, a magnetically operated means on said shaft for gripping and trimming the wire ends, a pivotal clip for holding said wires at the base of the intended splice, a switch, said clip automatically operating said switch to stop the machine at the completion of the splice, and magnetic means for restoring the machine to its initially operative position.

7. In a machine for splicing wire, a wire holding means, a magnetic wire gripping means, mechanical wire twisting means, electrical starting and stopping means, circuits for actuating the same controlled by the wires to be spliced, and magnetic restoring means.

8. In a machine for splicing wires, an electric motor for twisting the wires, a pivotal member for holding said wires at the base of the intended splice, said pivotal member moving to break an electrical circuit to stop said motor at the completion of the splice, and automatic magnetic means for preparing the machine for the next splice.

9. In a machine for splicing wires, rotary means for twisting the wires together, means for rotating the same, said rotary means breaking said wires by twisting them off at the completion of the splice, means operated thereby to cause the machine to stop, and automatic means for preparing the machine for a succeeding splice.

10. A wire splicing machine consisting of two wire gripping heads, an electric motor for revolving one of said heads to twist the wires together, magnetic stopping means operated by the twisting off of the wires at the completion of the splice, and a magnetically operated mechanism for restoring the machine to its initial position in readiness for the next splice.

11. In a machine for splicing wires, rotary means for twisting wires together, means for rotating the same, said rotary means twisting off the wires at the completion of the splice, means actuated thereby for stopping said rotary means, and auxiliary means for preparing said rotary means for the following splice.

12. In a machine for splicing the corresponding wires of two or more cables, a clip for holding said wires at the base of the intended splice, a rotatable shaft to which the free ends of said wires are mechanically gripped, a rotary means for rotating said shaft, an electrical contact for automatically starting the machine, said rotatable shaft adapted to twist said wires until broken at the completion of said splice by the deformation of the wires thereby stopping the machine, and magnetic means for automatically restoring the machine to the initial starting position.

13. In a machine for joining wires, means for gripping said wires at the base of the intended joint, rotatable means for gripping the free ends of said wires, means for rotating said rotatable means to twist said wires together, said rotatable means breaking off said wires at their free ends upon completion of the joint, means actuated thereby for stopping the rotatable means, and restoring means for returning said rotatable means to its initial position.

14. A machine for making a twisted wire splice, comprising a member for holding the base of the wires to be spliced, a rotatable clamp for holding the free ends of the wires, means for rotating said clamp, said means breaking the wires upon the completion of the splice, means actuated thereby for stopping the rotation of said rotatable clamp, and means for restoring said rotatable clamp to its initial position.

15. In a machine for splicing wires, rotary means for twisting the wires together, means for rotating the same, said rotary means breaking said wires by twisting them off at the completion of the splice, and means for simultaneously stopping said rotary means.

In witness whereof, we hereunto subscribe our names this 29th day of April A. D., 1925.

DAVID T. MAY.
CHARLES G. McCORMICK.